US012327966B2

(12) United States Patent
Liu

(10) Patent No.: US 12,327,966 B2
(45) Date of Patent: Jun. 10, 2025

(54) MULTI-WAY SLIDING PLUG

(71) Applicant: SHENZHEN OULI TECHNOLOGY CO., LTD., Guangdong (CN)

(72) Inventor: Song Liu, Guangdong (CN)

(73) Assignee: SHENZHEN OULI TECHNOLOGY CO., LTD., Shenzhen (CN)

( * ) Notice: Subject to any disclaimer, the term of this patent is extended or adjusted under 35 U.S.C. 154(b) by 405 days.

(21) Appl. No.: 18/066,295

(22) Filed: Dec. 15, 2022

(65) Prior Publication Data

US 2024/0120695 A1 Apr. 11, 2024

(30) Foreign Application Priority Data

Oct. 8, 2022 (CN) ........................ 202211221719.9

(51) Int. Cl.

*H01R 27/02* (2006.01)
*H01R 13/05* (2006.01)
*H01R 13/642* (2006.01)
*H01R 24/68* (2011.01)

(52) U.S. Cl.

CPC ............. *H01R 27/02* (2013.01); *H01R 13/05* (2013.01); *H01R 13/642* (2013.01); *H01R 24/68* (2013.01)

(58) Field of Classification Search

CPC ...... H01R 27/02; H01R 13/05; H01R 13/642; H01R 24/68; H01R 24/00; H01R 13/688; H01R 27/00; H01R 31/06; H01R 13/40; H01R 13/60

See application file for complete search history.

(56) References Cited

FOREIGN PATENT DOCUMENTS

| | | | | | |
|---|---|---|---|---|---|
| CN | 102150332 | A | | 8/2011 | |
| CN | 109417257 | A | * | 3/2019 | |
| WO | WO-02063722 | A2 | * | 8/2002 | ............. H01R 27/00 |
| WO | WO-2017080508 | A1 | * | 5/2017 | ........... H01R 13/447 |

* cited by examiner

*Primary Examiner* — Travis S Chambers

(57) ABSTRACT

The present disclosure discloses a multi-way sliding plug, including a housing, and a British standard pin, an American standard pin and a European standard pin which are slidably mounted on the housing respectively; a British standard region is formed among three legs of the British standard pin; an American standard region is formed among three legs of the American standard pin; a European standard region is formed among three legs of the European standard pin; the English standard region, the American standard region and the European standard region are sequentially distributed on an outer surface of the housing; and the American standard region interferes with the English standard region and the European standard region respectively. The multi-way sliding plug has the characteristics of small size and convenience in carrying; and the compactness of the structure is improved, the utilization rate of the inner space of the housing is increased.

9 Claims, 4 Drawing Sheets

MULTI-WAY SLIDING PLUG

CROSS REFERENCE TO RELATED APPLICATIONS

The present application claims the benefit of Chinese Patent Application No. 202211221719.9 filed on Oct. 8, 2022, the contents of which are incorporated herein by reference in their entirety.

TECHNICAL FIELD

The present disclosure relates to the technical field of power converters, and in particular to a multi-way sliding plug.

BACKGROUND ART

Since the standards for sockets in each country are not completely uniform, a plug cannot be universally used all over the world. When a consumer goes to different countries, the consumer needs to prepare plugs corresponding to the countries for supplying power to carry-on electronic devices, and if the consumer goes to several countries at a time, the consumer has to carry power plugs corresponding to several countries, which brings great trouble to people traveling across countries or on business trips.

Therefore, there are multi-national power plugs applicable to different national socket standards on the market. For example, Chinese invention patent with the application number CN200980132171.7 discloses a multi-way sliding plug, and specifically discloses multiple groups of conductive pins respectively containing three pins; and as the multiple groups of conductive pins are arranged in sequence in one direction, the multiple groups of conductive pins occupy a large space, which results in a large size of the whole product, and makes the realization of miniaturization of the product be impossible and the product be inconvenient to carry.

SUMMARY OF THE INVENTION

The technical problem to be solved by the present disclosure is to provide a multi-way sliding plug that is convenient to carry.

In order to solve the above technical problem, the technical solution adopted by the present disclosure is as follows: the multi-way sliding plug includes a housing, and an British standard pin, an American standard pin and a European standard pin which are slidably mounted on the housing respectively; a British standard region is formed among three legs of the British standard pin; an American standard region is formed among three legs of the American standard pin; a European standard region is formed among three legs of the European standard pin; the British standard region, the American standard region and the European standard region are sequentially distributed on an outer surface of the housing; the British standard region is in the shape of an upright isosceles triangle; the American standard region and the European standard region are in the shape of inverted isosceles triangle respectively; and the American standard region interferes with the British standard region and the European standard region respectively.

The present disclosure has the beneficial effects: the multi-way sliding plug provided by the present disclosure has the characteristics of small size and convenience in carrying, and the American standard region is arranged to interfere with the British standard region and the European standard region, so that the compactness of the structure is improved, the utilization rate of the inner space of the housing is increased, the overall size is reduced, and the plug is convenient to carry.

DESCRIPTION OF REFERENCE NUMERALS

Figure 1:
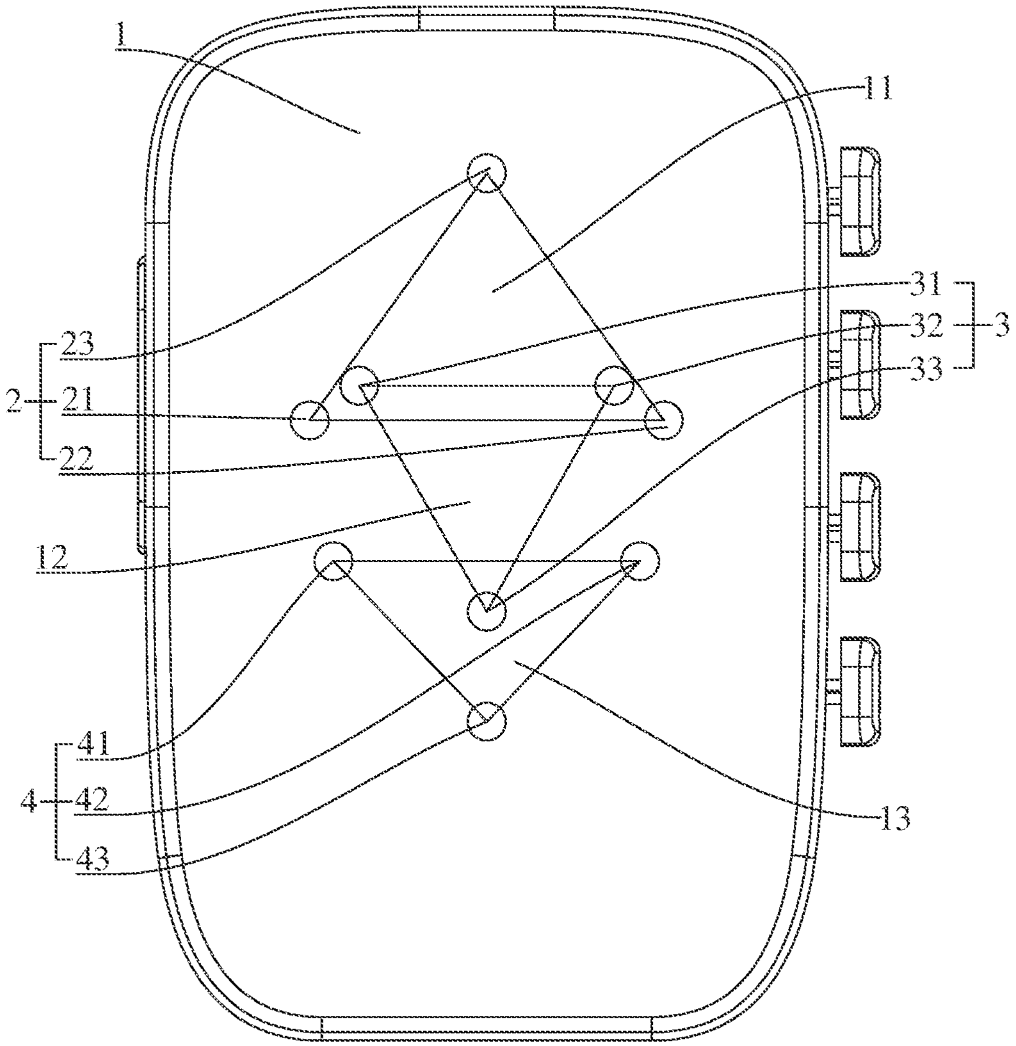
FIG. 1 is a simplified structural schematic diagram of a multi-way sliding plug according to a first embodiment of the present disclosure.
Figure 2:
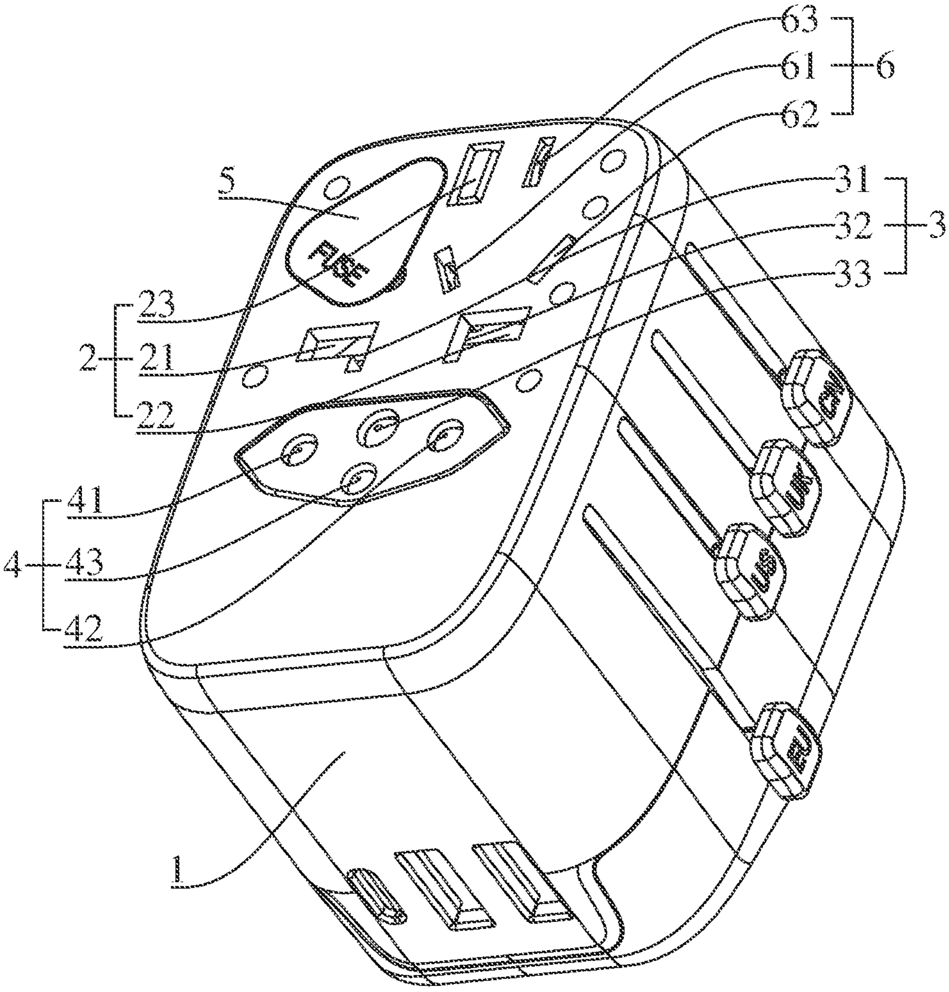
FIG. 2 is a structural schematic diagram of a multi-way sliding plug according to a first embodiment of the present disclosure.
Figure 3:
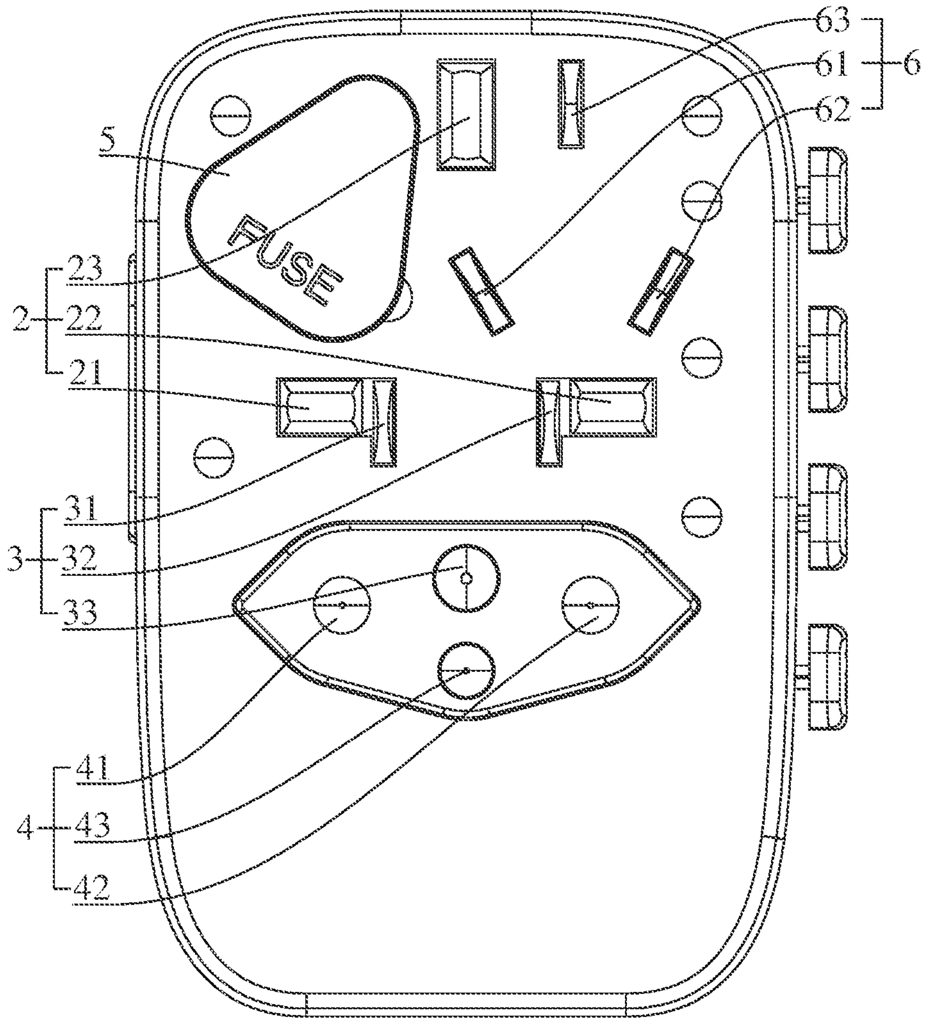
FIG. 3 is a structural schematic diagram of a bottom surface of a housing of a multi-way sliding plug according to a first embodiment of the present disclosure.

1. housing; 11. British standard region; 12. American standard region; 13. European standard region; 2. British standard pin; 21. first live wire leg; 211. first live wire conductive sheet; 212. first avoidance notch; 22. first neutral wire leg; 221. first neutral wire conductive sheet; 222. second avoidance notch; 23. first ground wire leg; 3. American standard pin; 31. second live wire leg; 311. second live wire conductive sheet; 312. third avoidance notch; 32. second neutral wire leg; 321. second neutral wire conductive sheet; 322. fourth avoidance notch; 33. second ground wire leg; 4. European standard pin; 41. third live wire leg; 42. third neutral wire leg; 43. third ground wire leg; 5. fuse; 6. Chinese standard pin; 61. fourth live wire leg; 62. fourth neutral wire leg; and 63. fourth ground wire leg.

DETAILED DESCRIPTION OF THE INVENTION

In order to explain the technical contents, achieved objectives, and effects of the present disclosure in detail, description will be made below in combination with embodiments and accompanying drawings.

Referring to FIG. 1 to FIG. 4, a multi-way sliding plug includes a housing 1, and an British standard pin 2, an American standard pin 3 and a European standard pin 4 which are slidably mounted on the housing 1 respectively; a British standard region 11 is formed among three legs of the British standard pin 2; an American standard region 12 is formed among three legs of the American standard pin 3; a European standard region 13 is formed among three legs of the European standard pin 4; the British standard region 11, the American standard region 12 and the European standard region 13 are sequentially distributed on an outer surface of the housing 1; the British standard region 11 is in the shape of an upright isosceles triangle; the American standard region 12 and the European standard region 13 are in the shape of inverted isosceles triangles respectively; and the American standard region 12 interferes with the British standard region 11 and the European standard region 13 respectively.

It can be seen from the above description that the present disclosure has the beneficial effects: the American standard region 12 is arranged to interfere with the British standard region 11 and the European standard region 13, so that the compactness of the structure is improved, the utilization rate of the inner space of the housing 1 is increased, the overall size is reduced, and the plug is convenient to carry.

Further, the three legs of the British standard pin 2 include a first live wire leg 21, a first neutral wire leg 22, and a first ground wire leg 23; the three legs of the American standard pin 3 include a second live wire leg 31, a second neutral wire leg 32, and a second ground wire leg 33; and the three legs of the European standard pin 4 includes a third live wire leg 41, a third neutral wire leg 42, and a third ground wire leg 43.

Further, the second live wire leg 31 and the second neutral wire leg 32 are located between the first live wire leg 21 and the first neutral wire leg 22.

It can be seen from the above description that the second live wire leg 31 and the second neutral wire leg 32 are arranged between the first live wire leg 21 and the first neutral wire leg 22, so that the space outside two shoulders of the British standard region 11 is maximally avoided, and the layout of other components is facilitated.

Further, the first live wire leg 21 is provided with a first live wire conductive sheet 211, and the first live wire conductive sheet 211 is located on one side, facing away from the first neutral wire leg 22, of the first live wire leg 21; and the first neutral wire leg 22 is provided with a first neutral wire conductive sheet 221, and the first neutral wire conductive sheet 221 is located on one side, facing away from the first live wire leg 21, of the first neutral wire leg 22.

It can be seen from the above description that the first live wire conductive sheet 211 is located on one side, facing away from the first neutral wire leg 22, of the first live wire leg 21, and the first neutral wire conductive sheet 221 is located on one side, facing away from the first live wire leg 21, of the first neutral wire leg 22, so that the space between the first live wire leg 21 and the first neutral wire leg 22 can be avoided, the arrangement of the second live wire leg 31 and the second neutral wire leg 32 is facilitated, and the risks of the first live wire conductive sheet 211 interfering with the second live wire leg 31 and the first neutral wire conductive sheet 221 interfering with the second neutral wire leg 32 are avoided.

Further, a first avoidance notch 212 is formed in one side, close to the first neutral wire leg 22, of the first live wire leg 21, and a second avoidance notch 222 is formed in one side, close to the first live wire leg 21, of the first neutral wire leg 22.

It can be seen from the above description that the first avoidance notch 212 and the second avoidance notch 222 can increase the space between the first live wire leg 21 and the first neutral wire leg 22, and facilitate the arrangement of the second live wire leg 31 and the second neutral wire leg 32.

Further, the second live wire leg 31 is provided with a second live wire conductive sheet 311, and the second live wire conductive sheet 311 is located on one side, facing away from the second neutral wire leg 22, of the second live wire leg 31; and the second neutral wire leg 32 is provided with a second neutral wire conductive sheet 321, and the second neutral wire conductive sheet 321 is located on one side, facing away from the second live wire leg 31, of the second neutral wire leg 32.

It can be seen from the above description that the second live wire conductive sheet 311 is located on one side, facing away from the second neutral wire leg 32, of the second live wire leg 31, and the second neutral wire conductive sheet 321 is located on one side, facing away from the second live wire leg 31, of the second neutral wire leg 32, so that the risks of the second live wire conductive sheet 311 interfering with the first live wire leg 21 and the second neutral wire conductive sheet 321 interfering with the first neutral wire leg 22 are avoided.

Further, a third avoidance notch 212 is formed in one side, facing away from the second neutral wire leg 32, of the second live wire leg 31, and a fourth avoidance notch 322 is formed one side, facing away from the second live wire leg 31, of the second neutral wire leg 32.

It can be seen from the above description that the third avoidance notch 312 can reduce the risk of the second live wire leg 31 interfering with the first live wire leg 21, and the fourth avoidance notch 322 can reduce the risk of the second neutral wire leg 32 interfering with the first neutral wire leg 22.

Further, the second ground wire leg 33 is located between the third live wire leg 41 and the third neutral wire leg 42.

Further, the first ground wire leg 23, the second ground wire leg 33 and the third ground wire leg 43 are located on a same straight line.

Embodiment I

Referring to FIG. 1 to FIG. 4, the embodiment I of the present disclosure is as follows: a multi-way sliding plug includes a housing 1, and an British standard pin 2, an American standard pin 3 and a European standard pin 4 which are slidably mounted on the housing 1 respectively, in combination with FIG. 1, a British standard region 11 is formed among three legs of the British standard pin 2, an American standard region 12 is formed among three legs of the American standard pin 3, and a European standard region 13 is formed among three legs of the European standard pin 4; the British standard region 11, the American standard region 12 and the European standard region 13 are sequentially distributed on an outer surface of the housing 1; the British standard region 11 is in the shape of an upright isosceles triangle; the American standard region 12 and the European standard region 13 are in the shape of inverted isosceles triangles respectively; and the American standard region 12 interferes with the British standard region 11 and the European standard region 13 respectively. Thus, the compactness of the structure is improved, the utilization rate of the inner space of the housing 1 is increased, the overall size is reduced, and the plug is convenient to carry.

Preferably, the three legs of the British standard pin 2 include a first live wire leg 21, a first neutral wire leg 22, and a first ground wire leg 23; the three legs of the American standard pin 3 include a second live wire leg 31, a second neutral wire leg 32, and a second ground wire leg 33; and the three legs of the European standard pin 4 includes a third live wire leg 41, a third neutral wire leg 42, and a third ground wire leg 43. Specifically, the second live wire leg 31 and the second neutral wire leg 32 are located between the first live wire leg 21 and the first neutral wire leg 22. Thus, the space outside two shoulders of the British standard region 11 can be maximally avoided, and the layout of other components is facilitated. In the present embodiment, a fuse 5 and a Chinese standard pin 6 are respectively arranged on the two shoulders of the British standard pin 2. The Chinese standard pin 6 includes a fourth live wire leg 61, a fourth neutral wire leg 62, and a fourth ground wire leg 63; a Chinese standard region is formed by the above three legs of the Chinese standard pin 6; and the Chinese standard region interferes with the British standard region 11 and is in the shape of an upright isosceles triangle. Particularly, the second ground wire leg 33 is located between the third live wire leg 41 and the third neutral wire leg 42. The first ground wire leg 23, the second ground wire leg 33 and the third ground wire leg 43 are located on the same straight line.

Figure 4:
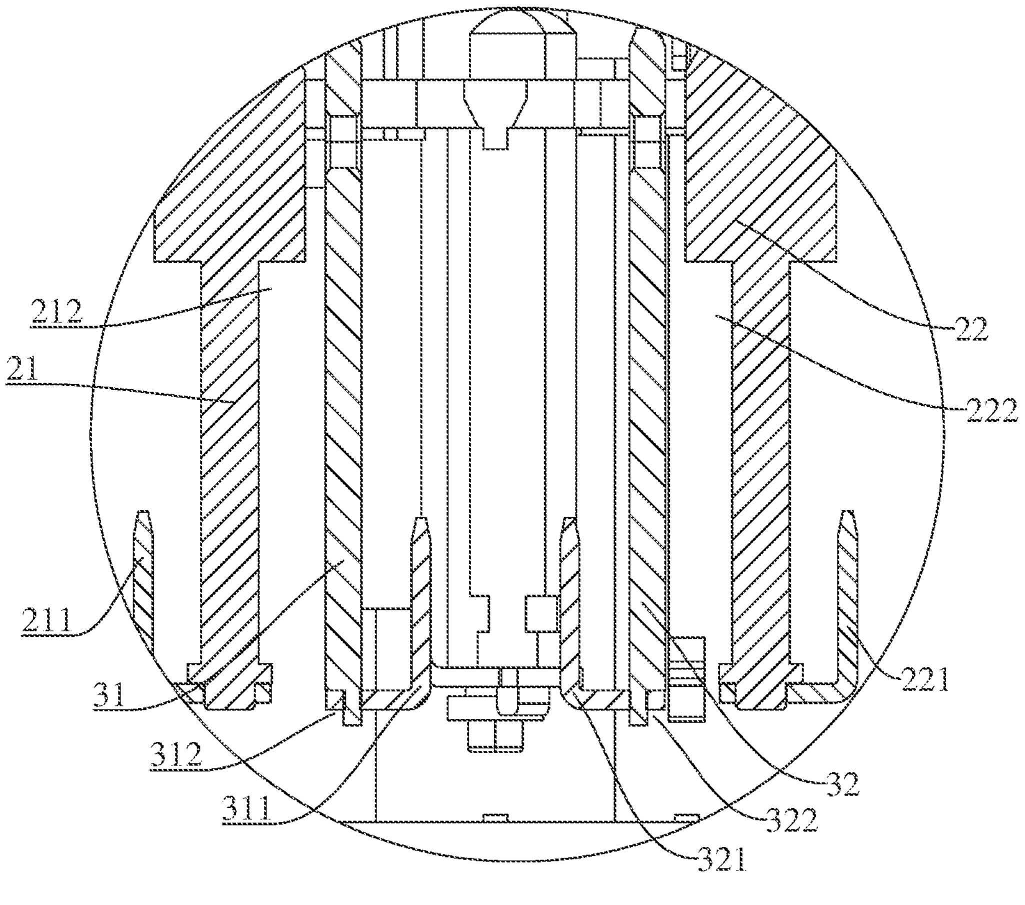
FIG. 4 is a structural schematic diagram of a local cross section of a multi-way sliding plug according to a first embodiment of the present disclosure.

In combination with FIG. 4, the first live wire leg 21 is provided with a first live wire conductive sheet 211, and the first live wire conductive sheet 211 is located on the periphery of the first live wire leg 21 except the outer side close to the first neutral wire leg 22. Preferably, the first live wire conductive sheet 211 is located on one side, facing away from the first neutral wire leg 22, of the first live wire leg 21; and the first neutral wire leg 22 is provided with a first neutral wire conductive sheet 221, and the first neutral wire conductive sheet 221 is located on the periphery of the first neutral wire leg 22 except the outer side close to the first live wire leg 21. Preferably, the first neutral wire conductive sheet 221 is located on one side, facing away from the first live wire leg 21, of the first neutral wire leg 22, the first live wire conductive sheet 211 is located on one side, facing away from the first neutral wire leg 22, of the first live wire leg 21, the first neutral wire conductive sheet 221 is arranged on one side, facing away from the first live wire leg 21, of the first neutral wire leg 22, so that the space between the first live wire leg 21 and the first neutral wire leg 22 can be avoided, the arrangement of the second live wire leg 31 and the second neutral wire leg 32 is facilitated, and the risks of the first live wire conductive sheet 211 interfering with the second live wire leg 31 and the first neutral wire conductive sheet 221 interfering with the second neutral wire leg 32 are avoided. Specifically, a first avoidance notch 212 is formed in one side, close to the first neutral wire leg 22, of the first live wire leg 21, and a second avoidance notch 222 is formed in one side, close to the first live wire leg 21, of the first neutral wire leg 22. The first avoidance notch 212 and the second avoidance notch 222 can increase the space between the first live wire leg 21 and the first neutral wire leg 22, and facilitate the arrangement of the second live wire leg 31 and the second neutral wire leg 32.

In the present embodiment, the second live wire leg 31 is provided with a second live wire conductive sheet 311, and the second live wire conductive sheet 311 is located on the periphery of the second live wire leg 31 except the outer side close to the second neutral wire leg 32. Preferably, the second live wire conductive sheet 311 is located on one side, facing away from the second neutral wire leg 32, of the second live wire leg 31. The second neutral wire leg 32 is provided with a second neutral wire conductive sheet 321, and the second neutral wire conductive sheet 321 is located on the periphery of the second neutral wire leg 32 except the outer side close to the second live wire leg 31. Preferably, the second neutral wire conductive sheet 321 is located on one side, facing away from the second live wire leg 31, of the second neutral wire leg 32. It is easy to understand that the second live wire conductive sheet 311 is arranged on one side, facing away from the second neutral wire leg 32, of the second live wire leg 31, and the second neutral wire conductive sheet 321 is arranged on one side, facing away from the second live wire leg 31, of the second neutral wire leg 32, so that the risks of the second live wire conductive sheet 311 interfering with the first live wire leg 21 and the second neutral wire conductive sheet 321 interfering with the first neutral wire leg 22 are avoided. Particularly, a third avoidance notch 212 is formed in one side, facing away from the second neutral wire leg 32, of the second live wire leg 31, and a fourth avoidance notch 322 is formed in one side, facing away from the second live wire leg 31, of the second neutral wire leg 32. The third avoidance notch 312 can reduce the risk of the second live wire leg 31 interfering with the first live wire leg 21, and the fourth avoidance notch 322 can reduce the risk of the second neutral wire leg 32 interfering with the first neutral wire leg 22.

In summary, the present disclosure has the characteristics of small size and convenience in carrying, and the American standard region is arranged to interfere with the British standard region and the European standard region, so that the compactness of the structure is improved, the utilization rate of the inner space of the housing is increased, the overall size is reduced, and the plug is convenient to carry.

The foregoing descriptions are merely preferred embodiments of the present disclosure but are not intended to limit the patent scope of the present disclosure. Any equivalent modifications made based on the content of the specification and the accompanying drawings of the present disclosure for direct or indirect use in other relevant technical fields shall also be encompassed in the patent protection scope of the present disclosure.

What is claimed is:

1. A multi-way sliding plug, comprising a housing, and a British standard pin, an American standard pin and a European standard pin which are slidably mounted on the housing respectively, wherein a British standard region is formed among three legs of the British standard pin; an American standard region is formed among three legs of the American standard pin; a European standard region is formed among three legs of the European standard pin; the British standard region, the American standard region and the European standard region are sequentially distributed on an outer surface of the housing; the British standard region is in the shape of an upright isosceles triangle; the American standard region and the European standard region are in the shape of inverted isosceles triangles respectively; and the American standard region interferes with the British standard region and the European standard region respectively.

2. The multi-way sliding plug according to claim 1, wherein the three legs of the British standard pin comprise a first live wire leg, a first neutral wire leg, and a first ground wire leg; the three legs of the American standard pin comprise a second live wire leg, a second neutral wire leg, and a second ground wire leg; and the three legs of the European standard pin comprise a third live wire leg, a third neutral wire leg, and a third ground wire leg.

3. The multi-way sliding plug according to claim 2, wherein the second live wire leg and the second neutral wire leg are located between the first live wire leg and the first neutral wire leg.

4. The multi-way sliding plug according to claim 3, wherein the first live wire leg is provided with a first live wire conductive sheet, and the first live wire conductive sheet is located on one side, facing away from the first neutral wire leg, of the first live wire leg; and the first neutral wire leg is provided with a first neutral wire conductive sheet, and the first neutral wire conductive sheet is located on one side, facing away from the first live wire leg, of the first neutral wire leg.

5. The multi-way sliding plug according to claim 3, wherein a first avoidance notch is formed in one side, close to the first neutral wire leg, of the first live wire leg, and a second avoidance notch is formed in one side, close to the first live wire leg, of the first neutral wire leg.

6. The multi-way sliding plug according to claim 3, wherein the second live wire leg is provided with a second live wire conductive sheet, and the second live wire conductive sheet is located on one side, facing away from the second neutral wire leg, of the second live wire leg; and the second neutral wire leg is provided with a second neutral wire conductive sheet, and the second neutral wire conductive sheet is located on one side, facing away from the second live wire leg, of the second neutral wire leg.

7. The multi-way sliding plug according to claim 3, wherein a third avoidance notch is formed in one side, facing away from the second neutral wire leg, of the second live wire leg, and a fourth avoidance notch is formed in one side, facing away from the second live wire leg, of the second neutral wire leg.

8. The multi-way sliding plug according to claim 2, wherein the second ground wire leg is located between the third live wire leg and the third neutral wire leg.

9. The multi-way sliding plug according to claim 2, wherein the first ground wire leg, the second ground wire leg and the third ground wire leg are located on a same straight line.

* * * * *